(12) United States Patent
Isobe et al.

(10) Patent No.: US 10,022,827 B2
(45) Date of Patent: Jul. 17, 2018

(54) METHOD FOR INITIALLY SETTING POSITION OF ORIGIN OF LINK ACTUATORS, AND LINK ACTUATOR

(71) Applicant: NTN Corporation, Osaka (JP)

(72) Inventors: Hiroshi Isobe, Iwata (JP); Hiroyuki Yamada, Iwata (JP); Keisuke Sone, Hamamatsu (JP)

(73) Assignee: NTN CORPORATION, Osaka (JP)

( * ) Notice: Subject to any disclaimer, the term of this patent is extended or adjusted under 35 U.S.C. 154(b) by 1108 days.

(21) Appl. No.: 14/255,214

(22) Filed: Apr. 17, 2014

(65) Prior Publication Data

US 2014/0223722 A1    Aug. 14, 2014

Related U.S. Application Data

(63) Continuation of application No. PCT/JP2012/077542, filed on Oct. 25, 2012.

(30) Foreign Application Priority Data

Nov. 2, 2011  (JP) ................. 2011-241072

(51) Int. Cl.
  *B23P 19/04*   (2006.01)
  *B25J 9/16*    (2006.01)
  *B25J 9/00*    (2006.01)

(52) U.S. Cl.
  CPC ............. *B23P 19/04* (2013.01); *B25J 9/0048* (2013.01); *B25J 9/1623* (2013.01); *Y10T 29/49826* (2015.01); *Y10T 29/53* (2015.01)

(58) Field of Classification Search
  CPC ......... Y10T 29/49758; Y10T 29/49778; Y10T 29/49771; Y10T 29/49895;
  (Continued)

(56) References Cited

U.S. PATENT DOCUMENTS 5,706,691 A * 1/1998 Okamoto ................. B21D 5/12
                                                  72/20.1
5,893,296 A   4/1999 Rosheim
(Continued)

FOREIGN PATENT DOCUMENTS

CN     1788948      6/2006
CN     101554727   10/2009
(Continued)

OTHER PUBLICATIONS

Translation of JP 2010-207967, generated Jun. 12, 2017.*
(Continued)

*Primary Examiner* — Matthew P Travers

(57) ABSTRACT

The method for initially setting a position of an origin of an actuator includes a first step of setting a distal end posture being a posture of a distal end side link hub relative to a proximal end side link hub of a link actuator to a specified posture; a second step of applying a preload, which is a force that causes the distal end posture to be changed, to the link actuator having the distal end posture being the specified posture; and a third step of storing an amount of operation of each actuator in a state where the preload is applied to the link actuator, wherein the stored amount of operation is set as the position of the origin of the actuator.

8 Claims, 11 Drawing Sheets

(58) Field of Classification Search
CPC ......... Y10T 74/20305; Y10T 74/20317; Y10T 74/20329; Y10T 74/20335; B25J 9/0048; B25J 9/1623; B25J 19/00; B25J 9/1692; B25J 19/0066; B25J 9/0081; B23P 19/04
USPC .......................................................... 901/18
See application file for complete search history.

(56) References Cited

U.S. PATENT DOCUMENTS

| | | | |
|---|---|---|---|
| 7,971,505 | B2 | 7/2011 | Isobe et al. |
| 8,132,481 | B2 | 3/2012 | Nishida et al. |
| 2005/0199085 | A1 | 9/2005 | Isobe et al. |
| 2006/0201275 | A1 | 9/2006 | Ono |
| 2006/0213308 | A1 | 9/2006 | Rosheim |
| 2009/0255363 | A1 | 10/2009 | Nishida et al. |
| 2011/0252912 | A1 | 10/2011 | Nakagiri et al. |

FOREIGN PATENT DOCUMENTS

| | | |
|---|---|---|
| EP | 0 987 087 A2 | 3/2000 |
| JP | 10-034572 | 2/1998 |
| JP | 2000-094245 | 4/2000 |
| JP | 2005-147333 | 6/2005 |
| JP | 2005-256952 | 9/2005 |
| JP | 2005-305585 | 11/2005 |
| JP | 2010-207967 | 9/2010 |

OTHER PUBLICATIONS

Translation of JP 2005-305585, generated Jun. 12, 2017.*
Translation of JPH1034572, generated Jun. 15, 2017.*
Chinese Office Action dated Jan. 12, 2016 in corresponding Chinese Patent Application No. 201280053676.6.
International Search Report dated Dec. 18, 2012 in corresponding International Application No, PCT/JP2012/077542.
PCT International Preliminary Report on Patentability dated May 15, 2014 in corresponding International Patent Application No. PCT/JP2012/077542.
Robertz et al., "Precise robot motions using dual motor control", 2010 IEEE International Conference on Robotics and Automation, Anchorage Convention District, IEEE, May 3-8, 2010 Anchorage, Alaska, USA, pp. 5613-5620.
Müller, "Internal Preload Control of redundantly actuated Parallel Manipulators-Backlash avoiding Control", Proceedings of the 2005 IEEE International Conference on Robotics and Automations, IEEE, Apr. 2005, Barcelona, Spain, pp. 948-953.
Extended European Search Report dated Jun. 7, 2016 in corresponding European Patent Application No. 12845929.4.
Japanese Office Action dated Nov. 24, 2015 in corresponding Japanese Patent Application No. 2011-241072.

* cited by examiner

METHOD FOR INITIALLY SETTING POSITION OF ORIGIN OF LINK ACTUATORS, AND LINK ACTUATOR

CROSS REFERENCE TO THE RELATED APPLICATION

This application is a continuation application, under 35 U.S.C § 111(a) of international application No. PCT/JP2012/077542, filed Oct. 25, 2012, which claims priority to Japanese Patent Application No. 2011-241072, filed Nov. 2, 2011, the entire disclosure of which is herein incorporated by reference as a part of this application.

BACKGROUND OF THE INVENTION

Field of the Invention

The present invention relates to a method for initially setting the position of an origin which serves as a reference for positioning operation in a link actuator for which a precise and wide operating range is required as in a medical device, an industrial device, or the like. The present invention also relates to a link actuator which can appropriately perform the initial setting.

Description of Related Art

One example of a working device equipped with a link mechanism body is disclosed in the Patent Document 1, and one example of a link actuator used in a medical device, an industrial device, or the like is disclosed in the Patent Document 2.

PRIOR ART DOCUMENT

[Patent Document 1] JP Laid-open Patent Publication No. 2000-94245
[Patent Document 2] U.S. Pat. No. 5,893,296

In the link mechanism body of Patent Document 1, the operating angle of each link is small. Therefore, in order to increase the operating range of the travelling plate, the link mechanism body is required to have an increased link length. Accordingly, a problem has been found that the dimensions of the mechanism as a whole increase and the apparatus tends to be bulky in size. Also, if the link length is increased, the rigidity of the mechanism as a whole tends to be lowered. For this reason, there has also been a problem that the weight of a tool mounted on the travelling plate, that is, the weight capacity of the travelling plate is limited to a small value. For these reasons, it is difficult to use the link mechanism body in a medical device or the like which requires the link mechanism body to be compact in size and to operate in a precise and wide operating range.

The link actuator of the Patent Document 2 is structured to include three or more trinodal chain link mechanisms, thereby being able to operate in a precise and wide operating range, although the link actuator is compact in size. However, even in the link actuator having the above structure, it is difficult to completely eliminate backlash caused by the mechanisms such as, for example, meshing portions between gears. Thus, occurrence of deviation in positioning caused by this backlash during operations has been inevitable. Moreover, in accordance with increase of the total operating time, backlash in drive mechanism sections such as gears or the like increases, and additionally, positioning accuracy is lowered under the influence of the backlash.

SUMMARY OF THE INVENTION

An object of the present invention is to provide, in order to increase the accuracy of positioning of a link actuator which is compact in size and can perform high-speed operation in a wide operating range, a method for initially setting the position of an origin which serves as a reference for the positioning operation. Another object of the present invention is to provide a link actuator which can appropriately perform such an initial setting.

The method for initially setting a position of an origin in a link actuator according to the present invention is applied to a link actuator having a basic configuration in which: a proximal end side link hub; a distal end side link hub; and three or more link mechanisms which connect the distal end side link hub to the proximal end side link hub such that alteration in posture is allowed are provided, wherein each of the link mechanisms includes: a proximal side end link member, one end of the proximal side end link member being rotatably connected to the proximal end side link hub; a distal side end link member, one end of the distal side end link member being rotatably connected to the distal end side link hub; and an intermediate link member whose two ends are rotatably connected to the other ends of the proximal side end link member and the distal side end link member, respectively, wherein each of the link mechanisms has such a shape that a geometric model of the link mechanism depicted in lines shows symmetry between a proximal end side portion thereof and a distal end side portion thereof with respect to an intermediate portion of the intermediate link member, and wherein all of the three or more link mechanisms are each provided with an actuator which arbitrarily alters a distal end posture which is a posture of the distal end side link hub relative to the proximal end side link hub. The method is for initially setting a position of an origin that serves as a reference for operation of each actuator.

The method includes a first step of setting the distal end posture of the link actuator to a specified posture; a second step of applying a preload, which is a force that causes the distal end posture to be changed, relative to the link actuator having the distal end posture being the specified posture; and a third step of storing an amount of operation of each actuator in a state where the preload is applied to the link actuator, wherein the stored amount of operation is set as a position of an origin of the actuator.

In the method for initially setting the position of the origin, in the first step, the distal end posture of the link actuator is set to the specified posture. The specified posture is a neutral posture in the design and for example, is the posture when the output of each actuator is zero. In the second step, the preload, which is a force that causes backlash occurring in each revolute pair section, mechanism section or the like to be shifted to one side direction, is applied to the link actuator having the distal end posture being the specified posture. Accordingly, the backlash caused by the mechanisms such as, for example, the meshing portions between the gears of the link actuator is cut down. In the third step, the amount of operation of each actuator in a state where the preload is applied to the link actuator is stored. In a case where the torque of each actuator is controlled by a control device, the amount of operation is stored, for example, in a storage section of the control device. The stored amount of operation is set as the position of the origin of the actuator, and the actuator is controlled by the control device or the like. Accordingly, the actuator can be controlled without the influence of the backlash in the link actuator, and thus, the posture alteration accuracy of the distal end side link hub relative to the proximal end side link hub is good.

In the present invention, in the first step, the distal end posture of the link actuator may be set to the specified posture by inserting an origin positioning shaft through through-holes respectively provided in the proximal end side link hub and the distal end side link hub of the link actuator. In this case, by a simple operation of inserting the origin positioning shaft through the through-holes of the proximal end side link hub and the distal end side link hub, the distal end posture of the link actuator can be easily set to the specified posture.

In order to implement the first step in the manner as described above, the link actuator may have the following configuration. That is, a link actuator of a first invention in the present invention has the basic configuration described above, each of the proximal end side link hub and the distal end side link hub is provided with a through-hole which allows the origin positioning shaft to be inserted therethrough, and central axes of the through-holes are respectively aligned with the central axes of the proximal end side link hub and the distal end side link hub. Since there is no other member around the central axes of the proximal end side link hub and the distal end side link hub of the link actuator, a relatively wide space is easy to be secured, and thus, the through-holes are easy to be provided. Moreover, the origin positioning shaft to be inserted through the through-holes is easy to be arranged without causing interference with the link mechanisms. Accordingly, in the second step, the preload can be applied to the link actuator in good balance.

In the present invention, in the first step, the distal end posture of the link actuator may be set to the specified posture by inserting an origin positioning shaft through through-holes respectively provided in the proximal end side link hub and the distal end side link hub of the link actuator, and in this state, a mounting member may be positioned to be mounted on both or either of the proximal end side link hub and the distal end side link hub of the link actuator. In this case, by a simple operation of inserting the origin positioning shaft through the through-holes of the proximal end side link hub and the distal end side link hub, the distal end posture of the link actuator can be easily set to the specified posture. In addition, the following effect can be obtained. That is, in a state where the distal end posture is set to the specified posture, by positioning and mounting a mounting member to both or either of the proximal end side link hub and the distal end side link hub, even if the mounting member is removed from the link hub once, the mounting member can be fixed at the same position when mounted next time. Therefore, there is no need to perform initial setting again when the mounting member is mounted next time. Moreover, since the positional relationship between the distal end side link hub and the mounting member is fixed, the position and the direction of the mounting member can be easily calculated from the distal end posture of the link actuator.

In order to implement the first step in the manner as described above, the link actuator may have the following configuration. That is, the link actuator of a second invention in the present invention has the basic configuration described above, each of the proximal end side link hub and the distal end side link hub is provided with a first through-hole which allows the origin positioning shaft to be inserted therethrough, and both or either of the proximal end side link hub and the distal end side link hub is provided with a first positioning pin insertion hole, and a mounting member to be mounted on the link hub provided with the positioning pin insertion hole is provided with a second through-hole and a second positioning pin insertion hole respectively corresponding to the first through-hole and the first positioning pin insertion hole of the link hub provided with the positioning pin insertion hole.

In this configuration, by a simple operation of inserting the origin positioning shaft through the through-holes of the proximal end side link hub and the distal end side link hub, the distal end posture of the link actuator can be easily set to the specified posture. At that time, by inserting the origin positioning shaft through the first through-holes of the proximal and distal end side link hubs, and the second through-hole of the mounting member, and further by inserting a positioning pin into the first positioning pin insertion hole of the link hub provided with the positioning pin insertion hole and the second positioning pin insertion hole of the mounting member, the link hub-provided with the positioning pin insertion hole and the mounting member are positioned with respect to each other, and in that state, the link hub provided with the positioning pin insertion hole and the mounting member are fixed together. Accordingly, even if the mounting member is removed from the link hub once, the mounting member can be fixed to the same position when the mounting member is mounted next time. Thus, there is no need to perform the initial setting again when the mounting member is mounted next time. Moreover, by using the origin positioning shaft also when performing positioning between the link hub and the mounting member, positioning at only one position by use of the positioning pin makes it possible to complete positioning between the link hub and the mounting member other than in the axial direction. Thus, if the link hub and the mounting member are fixed together lastly with bolts or the like, positioning of the mounting member can be easily performed with fewer components.

In the present invention, in the first step, in a case where the proximal end side link hub of the link actuator is fixed to take a posture such that a central axis of the proximal end side link hub extends in a vertical direction, a mounting member may be mounted on the distal end side link hub of the link actuator, levelness of a plane in this mounting member, that is orthogonal to a central axis of the distal end side link hub, may be measured by a level gauge, and the distal end posture when the plane is horizontal may be defined as the specified posture; or in a case where the proximal end side link hub of the link actuator is fixed to take a posture such that the central axis of the proximal end side link hub extends in a horizontal direction, a mounting member may be mounted on the distal end side link hub of the link actuator, levelness of a plane in this mounting member, that is parallel to the central axis of the distal end side link hub, may be measured by the level gauge, and the distal end posture when the plane is horizontal may be defined as the specified posture.

In many cases, the link actuator is disposed such that the central axis of the proximal end side link hub extends in the vertical direction or the horizontal direction. In a case where the link actuator is disposed such that the central axis of the proximal end side link hub extends in the vertical direction, by disposing the level gauge perpendicular to the central axis of the distal end side link hub, the distal end posture can be easily rendered to be the specified posture by use of the level gauge. In a case where the link actuator is disposed such that the central axis of the proximal end side link hub extends in the horizontal direction, by disposing the level gauge parallel to the central axis of the distal end side link hub, the distal end posture can be easily rendered to be the specified posture by use of the level gauge.

In the present invention, in the first step, in a case where an angle of the proximal side end link member relative to the proximal end side link hub when the distal end posture of the link actuator is the specified posture is defined as βini, a posture of the link actuator when the proximal side end link member is fixed such that the angle of the proximal side end link member relative to the proximal end side link hub becomes βini may be defined as the specified posture. In this case, by rendering the angle of the proximal side end link member relative to the proximal end side link hub to be βini, the distal end posture can be easily rendered to be the specified posture.

In the present invention, in the second step, the actuator may apply the preload to the link actuator taking the specified posture. In this case, the preload can be easily applied without providing another member for applying the preload.

In order to implement the method for initially setting a position of an origin described above, the link actuator may have the following configuration. That is, the link actuator of a third invention in the present invention has the basic configuration described above, and further includes a control device which controls the actuator so as to apply the preload between the proximal end side link hub and the distal end side link hub. In this case, by the control device controlling each actuator so as to apply the preload that causes backlash occurring in each revolute pair section, mechanism section or the like in the link actuator to be shifted to one side direction, a constant torque is applied to each link mechanism, and thus, balance in force is attained. Therefore, in the case of using the origin positioning shaft in the first step, for example, even when the origin positioning shaft is pulled out from the through-holes of the link hubs, the position of the origin is not shifted to a great extent, whereby the position of the origin of each actuator can be accurately set.

In the present invention, in the second step, the proximal end side link hub of the link actuator may be fixed, a weight member may be mounted on the distal end side link hub, and the preload may be applied to the link actuator taking the specified posture, by means of a weight of the weight member. The preload caused by the weight member may be in the form of tensile load or compressive load. In this case, when the weight member is used, an appropriate preload can be easily applied to the link actuator. Accordingly, the position of the origin can be stored in a state where the backlash caused by the mechanisms such as, for example, the meshing portions between gears in the link actuator is cut down, and thus, the positioning accuracy of the distal end side link hub is increased.

In the present invention, in the third step, an output value from an absolute type encoder, that is, an encoder for absolute value detection which detects an amount of operation of the actuator may be stored as the amount of operation of the actuator in a state where the preload is applied to the link actuator. In this case, by the amount of operation of the actuator being detected by the absolute type encoder, even when the power is off and then supplied again, there is no need to perform the initial setting again, and thus, return to origin can be easily made.

In order to implement the method for initially setting a position of an origin described above, the link actuator may have the following configuration. That is, the link actuator of a fourth invention in the present invention has the basic configuration described above, and further includes an absolute type encoder which detects an amount of operation of the actuator. In this case, by using the absolute type encoder, even when the power is off and then supplied again, there is no need to perform the initial setting again, and thus, return to origin can be easily performed.

In any of the methods for initially setting a position of an origin in the link actuator described above, the amount of operation obtained in the third step may be stored as an amount of operation of the actuator corresponding to an angle of rotation βn of the proximal side end link member obtained by substituting θ=0 and φ=0 in $$\cos(\theta/2)\sin\beta n - \sin(\theta/2)\sin(\varphi+\delta n)\cos\beta n + \sin(\gamma/2) = 0$$

where an angle of rotation of the proximal side end link member relative to the proximal end side link hub is βn, an angle between a first connection end axis of the intermediate link member rotatably connected to the proximal side end link member and a second connection end axis of the intermediate link member rotatably connected to the distal side end link member is γ, an angle of spacing, in a circumferential direction, of each proximal side end link member relative to a proximal side end link member that serves as a reference is δn, a vertical angle formed when a central axis of the distal end side link hub is inclined relative to a central axis of the proximal end side link hub is θ, and a horizontal angle formed when the central axis of the distal end side link hub is inclined relative to the central axis of the proximal end side link hub is φ.

When a posture of the distal end side link hub relative to the proximal end side link hub is specified, the angle of rotation of each proximal side end link member can be calculated from the above equation. By performing output based on the calculated value to each actuator which drives its corresponding proximal side end link member, the posture of the distal end side link hub relative to the proximal end side link hub can be controlled. By storing the amount of operation obtained in the third step as the amount of operation of the actuator corresponding to the angle of rotation βn of the proximal side end link member obtained by substituting θ=0 and φ=0 in the equation above, no matter what posture is taken, posture control can be performed in a state where the preload that causes the backlash occurring in each revolute pair section, mechanism section or the like in the link actuator to be shifted in one side direction is applied to the link actuator.

Any combination of at least two configurations, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
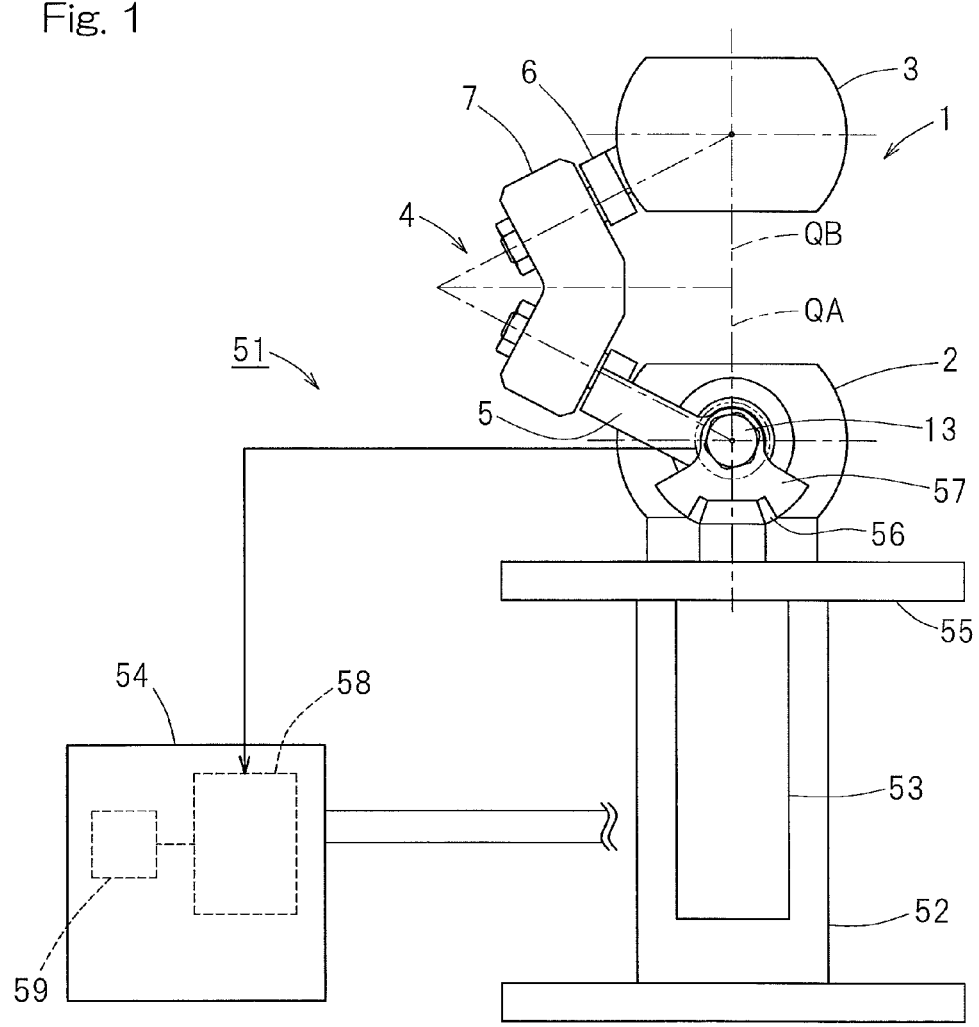
FIG. 1 is a front view showing a link actuator, with a portion thereof omitted, according to a first embodiment of the present invention.

A first embodiment of a link actuator to which a method for initially setting the position of an origin in a link actuator according to the present invention is applied will be described with reference to FIG. 1 to FIG. 6. As shown in FIG. 1, a link actuator 51 includes a link mechanism body 1, a base 52 which supports the link mechanism body 1, a plurality of actuators 53 (provided by the same number of link mechanisms 4 described later) which cause the link mechanism body 1 to operate, and a control device 58 which controls these actuators 53. In this example, the control device 58 is provided inside a controller 54, but the control device 58 may be provided separately from the controller 54.

Figure 2:
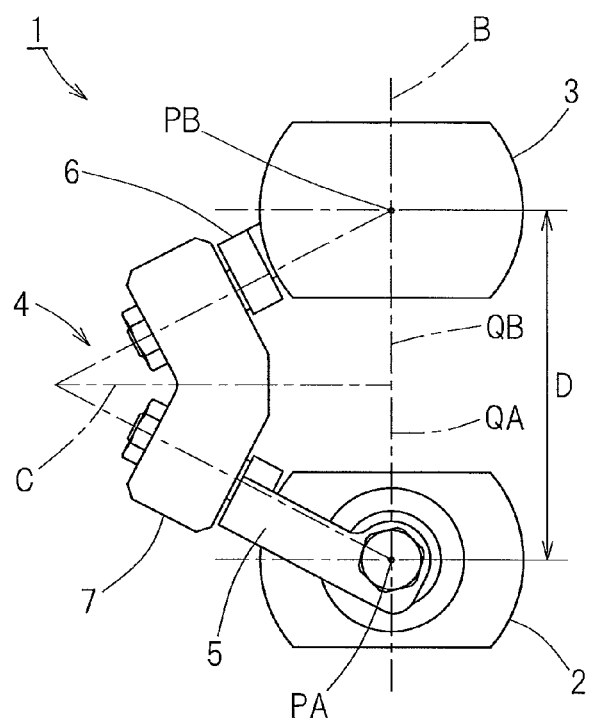
FIG. 2 is a front view showing a state of a link mechanism body, with a portion thereof omitted, of the link actuator.
Figure 3:
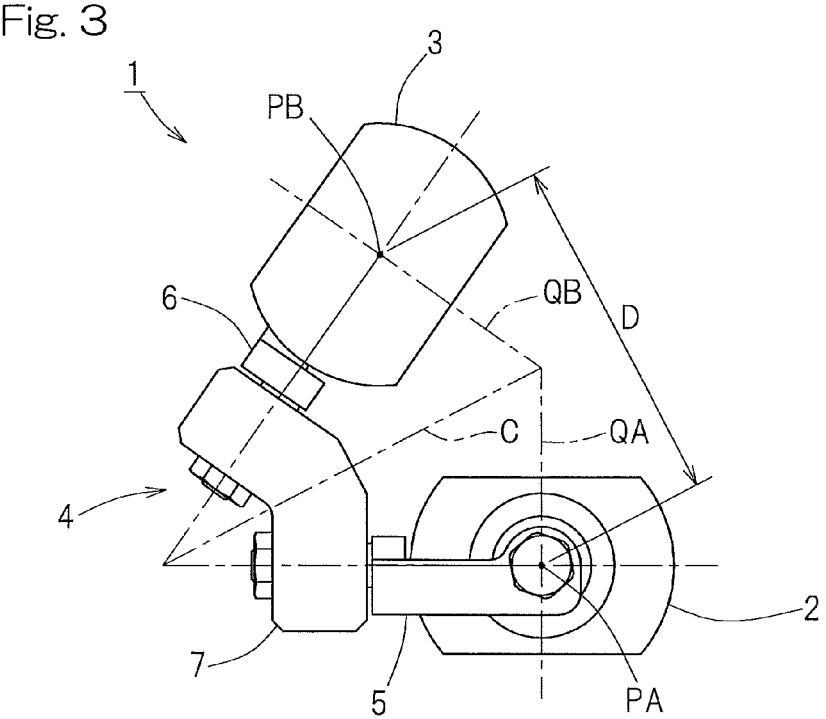
FIG. 3 is a front view showing a different state of the link mechanism body, with a portion thereof omitted, of the link actuator.

At first, the link mechanism body 1 is described. FIG. 2 and FIG. 3 are front views respectively showing different states of the link mechanism body 1. The link mechanism body 1 is of a type in which a distal end side link hub 3 is connected to a proximal end side link hub 2 via three link mechanisms 4 such that alteration in posture is allowed. In FIG. 2 and FIG. 3, only one link mechanism 4 is shown.

Figure 4:
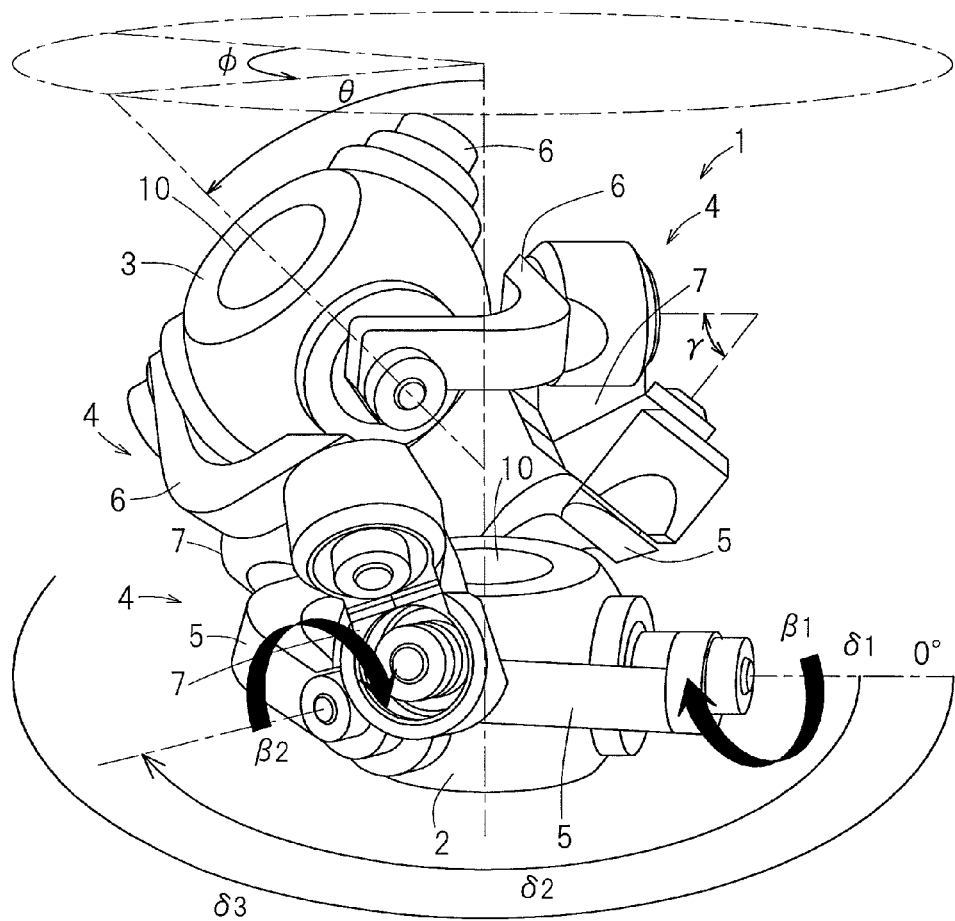
FIG. 4 is a perspective view showing a three-dimensional representation of the link mechanism body of the link actuator.

FIG. 4 is a perspective view showing a three-dimensional representation of the link mechanism body 1. Each link mechanism 4 includes a proximal side end link member 5, a distal side end link member 6, and an intermediate link member 7, and forms a trinodal chain link mechanism including four revolute pairs. The proximal side and distal side end link members 5 and 6 each have an L-shape. The proximal end of the proximal side end link member 5 is rotatably connected to the proximal end side link hub 2, and the proximal end of the distal side end link member 6 is rotatably connected to the distal end side link hub 3. The intermediate link member 7 has its opposite ends connected rotatably with the distal end of the proximal side end link member 5 and the distal end of the distal side end link member 6.

The proximal side and distal side end link members 5 and 6 each have a spherical link structure. Spherical link centers PA and PB (FIG. 2, FIG. 3) are in common among the three link mechanisms 4, and a distance D between the spherical link centers PA and PB is also the same among the three link mechanisms 4. The central axis of the revolute pair between the proximal side end link member 5 and the intermediate link member 7 and the central axis of the revolute pair between the distal side end link member 6 and the intermediate link member 7 may form an angle or may be parallel to each other.

Figure 5:
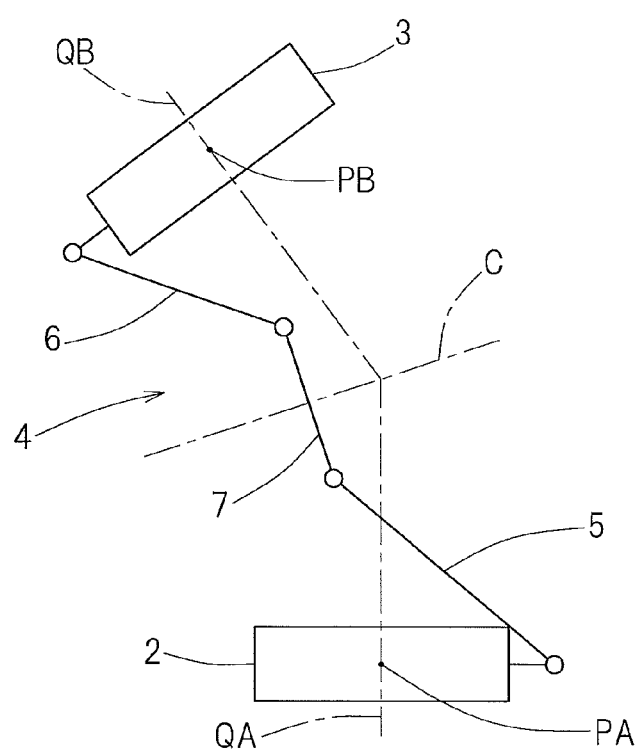
FIG. 5 is a schematic diagram showing one link mechanism depicted in lines of the link actuator.

In other words, the three link mechanisms 4 have a geometrically identical configuration. The geometrically identical configuration means that a geometric model depicted in lines representing the link members 5, 6, and 7, that is, a model depicted with the respective revolute pairs and lines connecting these revolute pairs represents a shape in which the proximal end side portion and the distal end side portion are symmetrical with each other with respect to the intermediate portion of the intermediate link member 7. FIG. 5 is a schematic diagram showing one link mechanism 4 depicted in lines.

The link mechanism 4 according to this embodiment is of a rotation symmetrical type, and employs a positional structure in which the positional relationship between a proximal side group of the proximal end side link hub 2 and the proximal side end link member 5 and a distal side group of the distal end side link hub 3 and the distal side end link member 6 is in rotational symmetry relative to a center line C of the intermediate link member 7. FIG. 2 shows a state where a central axis QA of the proximal end side link hub 2 and a central axis QB of the distal end side link hub 3 are on the same line, and FIG. 3 shows a state where the central axis QB of the distal end side link hub 3 has a predetermined operating angle relative to the central axis QA of the proximal end side link hub 2. Even when the posture of each link mechanism 4 changes, the distance D between the spherical link center PA on the proximal end side and the spherical link center PB on the distal end side does not change.

The proximal end side link hub 2, the distal end side link hub 3 and the three link mechanisms 4 construct a two-degrees-of-freedom mechanism in which the distal end side link hub 3 is movable in two axial directions perpendicular to each other relative to the proximal end side link hub 2. In other words, the mechanism allows the distal end side link hub 3 to rotate with two degrees of freedom to alter its posture, relative to the proximal end side link hub 2. This two-degrees-of-freedom mechanism is compact in size, but can realize a wide range of movement of the distal end side link hub 3 relative to the proximal end side link hub 2. For example, the maximum value (maximum bending angle) of a bending angle θ between the central axis QA of the proximal end side link hub 2 and the central axis QB of the distal end side link hub 3 can be set to be about ±90°. Moreover, an angle of traverse φ of the distal end side link hub 3 relative to the proximal end side link hub 2 can be set within a range of 0° to 360°. The bending angle θ means a vertical angle formed when the central axis QB of the distal end side link hub 3 is inclined relative to the central axis QA of the proximal end side link hub 2. The angle of traverse φ means a horizontal angle formed when the central axis QB of the distal end side link hub 3 is inclined relative to the central axis QA of the proximal end side link hub 2.

With respect to the link mechanism body 1, in a case where the angle between the axes of arbitrary two of the three shaft members 13 (FIG. 6) of the end link members 5 and 6 of each link mechanism 4 is identical and the lengths of such shaft members 13 are identical with each other, the geometrical shapes of the proximal side end link member 5 and the distal side end link member 6 are identical with each other, and the shapes at the proximal end side and the distal end side of the intermediate link member 7 are identical with each other, it is assumed that the angular positional relationship between the intermediate link member 7 and the proximal side end link member 5 and the angular positional relationship between the intermediate link member 7 and the distal side end link member 6 are rendered to be identical with each other relative to the symmetry plane of the intermediate link member 7, on both of the proximal end side and the distal end side. Then, due to geometric symmetry, the proximal side group of the proximal end side link hub 2 and the proximal side end link member 5, and the distal side group of the distal end side link hub 3 and the distal side end link member 6 will move in the same manner. For example, in a case where rotation axes are provided in the proximal end side and distal end side link hubs 2 and 3 in a manner coaxial with the central axes QA and QB, respectively, and rotation transmission is made from the proximal end side to the distal end side, a constant velocity universal joint is formed in which the proximal end side and the distal end side rotate by the same angle of rotation at an equal speed. The symmetry plane of the intermediate link member 7 at the time of the constant speed rotation is known as a constant velocity bisecting plane.

Therefore, by arranging a plurality of the link mechanisms 4 having the same geometric shape and commonly using the proximal end side link hub 2 and the distal end side link hub 3 on the circumferences thereof, as positions that allow compatible movement of the plurality of the link mechanisms 4, the intermediate link members 7 are limited to move on their respective constant velocity bisecting planes. Accordingly, even when the proximal end side and the distal end side assume an arbitrary operating angle, the proximal end side and the distal end side rotate at a constant speed.

Each of the proximal end side link hub 2 and the distal end side link hub 3 has a through-hole 10 formed in a center portion thereof and extending along the axial direction thereof, and is formed in a doughnut shape with a spherical external shape. The centers of the respective through-holes 10 are aligned with the central axes QA and QB of the proximal and distal end side link hub 2 and 3, respectively, and the internal diameter of each of through-holes 10 has a dimension that allows an origin positioning shaft 90 described later to be inserted therethrough in clearance fit. The proximal side end link members 5 and the distal side end link members 6 are respectively rotatably connected to the outer peripheral surfaces of the proximal end side link hub 2 and the distal end side link hub 3, at equal intervals in the circumferential direction thereof.

Figure 6:
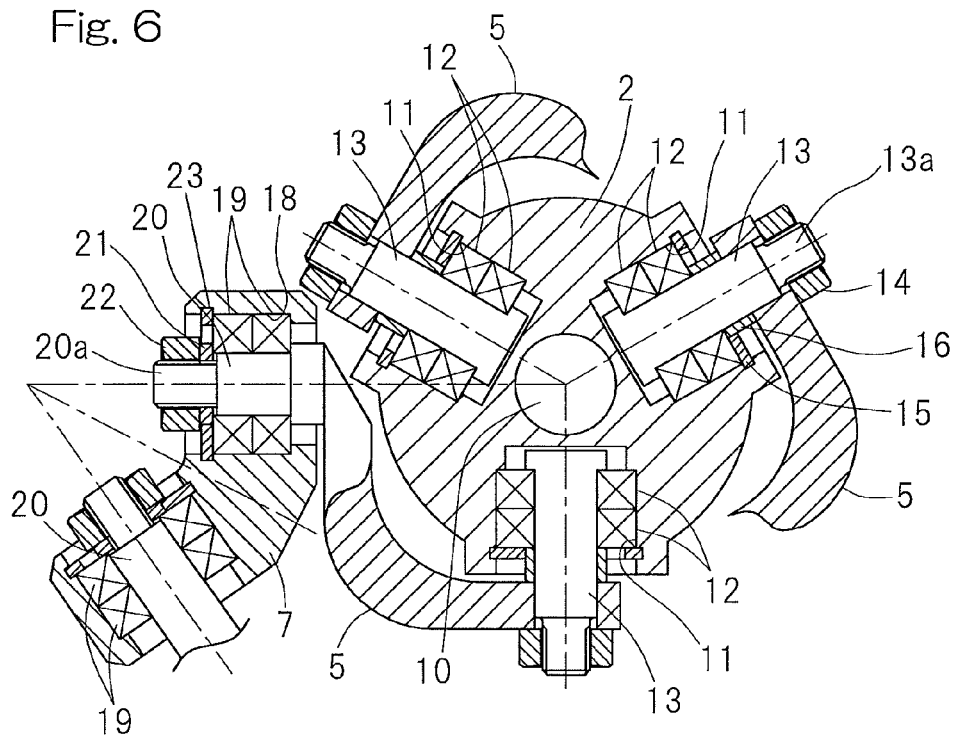
FIG. 6 is a horizontal sectional view of a portion of the link mechanism body of the link actuator.

FIG. 6 is a horizontal sectional view showing a revolute pair section between the proximal end side link hub 2 and the proximal side end link member 5, and a revolute pair section between the proximal side end link member 5 and the intermediate link member 7. The outer peripheral surface of the proximal end side link hub 2 is provided with shaft supporting holes 11 extending radially inwardly at three positions in the circumferential direction of the proximal end side link hub 2. Two bearings 12 provided in each shaft supporting hole 11 rotatably support the shaft member 13. The shaft member 13 has an outer end portion provided with a protruding screw portion 13*a* to protrude from the proximal end side link hub 2, and the proximal side end link member 5 is coupled to the protruding screw portion 13*a* and is fixedly fastened with a nut 14.

Each bearing 12 is a rolling bearing such as, for example, a deep groove ball bearing, and includes an outer ring (not shown) fitted on the inner periphery of the shaft supporting hole 11 and an inner ring (not shown) mounted on the outer periphery of the shaft member 13. The outer ring is prevented from slipping off by a retaining ring 15. Between the inner ring and the proximal side end link member 5, a spacer 16 is interposed, and thus, the fastening force of the nut 14 is transmitted to the inner ring via the proximal side end link member 5 and the spacer 16, thereby applying a predetermined preload to the bearing 12.

A communication hole 18 is provided at the intermediate link member 7 in the revolute pair section between the proximal side end link member 5 and the intermediate link member 7, and two bearings 19 are provided in the communication hole 18. These bearings 19 rotatably support a shaft portion 20 formed at the distal end of the proximal side end link member 5. The bearings 19 are fixedly fastened with a nut 22 via a spacer 21.

Each bearing 19 is a rolling bearing such as, for example, a deep groove ball bearing, and includes an outer ring (not shown) fitted on the inner periphery of the communication hole 18, and an inner ring (not shown) mounted on the outer periphery of the shaft portion 20. The outer ring is prevented from slipping off by a retaining ring 23. The fastening force of the nut 22 threadedly engaged on a distal end screw portion 20*a* of the shaft portion 20 is transmitted to the inner ring via the spacer 21, thereby applying a predetermined preload to the bearing 19.

The revolute pair section between the proximal end side link hub 2 and the proximal side end link member 5, and the revolute pair section between the proximal side end link member 5 and the intermediate link member 7 have been described above. The revolute pair section between the distal end side link hub 3 and the distal side end link member 6, and the revolute pair section between the distal side end link member 6 and the intermediate link member 7 have the same configuration as above (not shown).

As described above, the bearings 12, 19 are provided in the four revolute pair sections in each link mechanism 4, in other words, in the revolute pair section between the proximal end side link hub 2 and the proximal side end link member 5, in the revolute pair section between the distal end side link hub 3 and the distal side end link member 6, in the revolute pair section between the proximal side end link member 5 and the intermediate link member 7, and in the revolute pair section between the distal side end link member 6 and the intermediate link member 7. By employing this structure, the frictional resistance occurring in each revolute pair can be reduced, whereby the rotational resistance can be relieved. Accordingly, a smooth power transmission can be secured, and also, the durability thereof can be increased.

In the structure provided with the bearings 12, 19, by applying a preload to the bearings 12, 19, a radial clearance and a thrust clearance are eliminated and rattling of the revolute pair can be suppressed. Moreover, since rotation phase difference between the proximal end side link hub 2 and also, the distal end side link hub 3 side is eliminated, constant velocity can be maintained, and occurrence of vibration and abnormal sound can be suppressed. In particular, by providing the bearing clearance in each bearing 12, 19 as a negative clearance, backlash occurring between an input and an output can be reduced.

By providing each bearing 12 embedded in the proximal end side link hub 2 and the distal end side link hub 3, without enlarging the external shape of the entirety of the link mechanism body 1, the external shape of each of the proximal end side link hub 2 and the distal end side link hub 3 can be enlarged. Accordingly, the mounting space for mounting the proximal end side link hub 2 and the distal end side link hub 3 to other members can be easily secured.

With reference to FIG. 1, the base 52 is long in the vertical direction, and has a top face to which the proximal end side link hub 2 of the link mechanism body 1 is fixed. An actuator mounting base 55 having a collar shape is provided on the outer periphery of an upper portion of the base 52, and the actuators 53 are mounted to this actuator mounting base 55 so as to be suspended therefrom. The number of the actuators 53 is three being the same number as that of the link mechanisms 4. Each actuator 53 is implemented by a rotary actuator, and includes a bevel gear 56 mounted on the output shaft of the actuator 53 and a bevel gear 57 having a sector shape mounted on the shaft member 13 (FIG. 6) of the proximal end side link hub 2, with the respective bevel gears 56 and 57 being meshed with each other.

In the link actuator 51, the controller 54 is operated to drive each actuator 53 to rotate, thereby causing the link mechanism body 1 to operate. In detail, when the actuator 53 is driven to rotate, its rotation is transmitted to the shaft member 13 via a pair of bevel gears 56 and 57, whereby the angle of the proximal side end link member 5 relative to the proximal end side link hub 2 is altered. Accordingly, the posture of the distal end side link hub 3 relative to the proximal end side link hub 2 (hereinafter, referred to as "distal end posture") is determined.

The rotation drive of the actuator 53 for causing the link mechanism body 1 to operate may be manually performed by using an operation tool (not shown) provided to the controller 54, or may be automatically controlled by the control device 58 to attain a set amount defined by a setting instrument (not shown) provided to the controller 54. The control device 58 is of a type capable of being numerically controlled by a computer.

In a case where the automatic control is performed, a control target value of an angle of rotation βn of the proximal side end link member 5 is calculated in accordance with the distal end posture set by the setting instrument. The calculation of the angle of rotation βn is carried out by inverse transformation of the following equation 1. The inverse transformation is a transformation for calculating the angle of rotation βn of the proximal side end link member 5 from the bending angle θ (FIG. 4) between the central axis QA of the proximal end side link hub 2 and the central axis QB of the distal end side link hub 3, and the angle of traverse φ (FIG. 4) of the distal end side link hub 3 relative to the proximal end side link hub 2.

$$\cos(\theta/2)\sin\beta n - \sin(\theta/2)\sin(\varphi+\delta n)\cos\beta n + \sin(\gamma/2) = 0 \quad \text{(equation 1)}$$

In this equation 1, γ (FIG. 4) is the angle between a first connection end axis of the intermediate link member 7 rotatably connected to the proximal side end link member 5 and a second connection end axis of the intermediate link member 7 rotatably connected to the distal side end link member 6. δn (δ1, δ2, and δ3 shown in FIG. 4) is the angle of spacing, in the circumferential direction, of each proximal side end link member 5 relative to the proximal side end link member 5 that serves as a reference.

If the control target value of the angle of rotation βn has been calculated, feedback control is performed on each actuator 53 such that the angle of rotation βn approaches the control target value, by utilizing a signal from a posture detecting unit 59 detecting the distal end posture. In the example shown in FIG. 1, the posture detecting unit 59 detects the amount of operation of each actuator 53 by detecting the angle of rotation βn (β1, β2 shown in FIG. 4) of its corresponding proximal side end link member 5. The posture detecting unit 59 is implemented by, for example, an absolute type encoder or an encoder for absolute value detection. The bending angle θ and the angle of traverse φ have a mutual relationship with the angle of rotation βn, and therefore, from one value, the other value can be obtained. As described above, by controlling the rotation drive of each actuator 53, the distal end posture is determined.

In the case of the link actuator 51, it is difficult to completely eliminate backlash caused by the mechanisms such as in the meshing portion or the like of the pair of the bevel gears 56 and 57, for example. In accordance with increase of the total operating time, the backlash of the bevel gears 56 and 57 or the like increases, and the backlash increases. When the actuator 53 is controlled with the presence of the backlash ignored, deviation will occur in the distal end posture, corresponding to the backlash. Therefore, in order to eliminate the above-described deviation occurring in the distal end posture, the position of an origin that serves as a reference for operation of the actuator 53 is initially set in accordance with the magnitude of the backlash. The method for initially setting the position of the origin will be described later.

Figure 7:
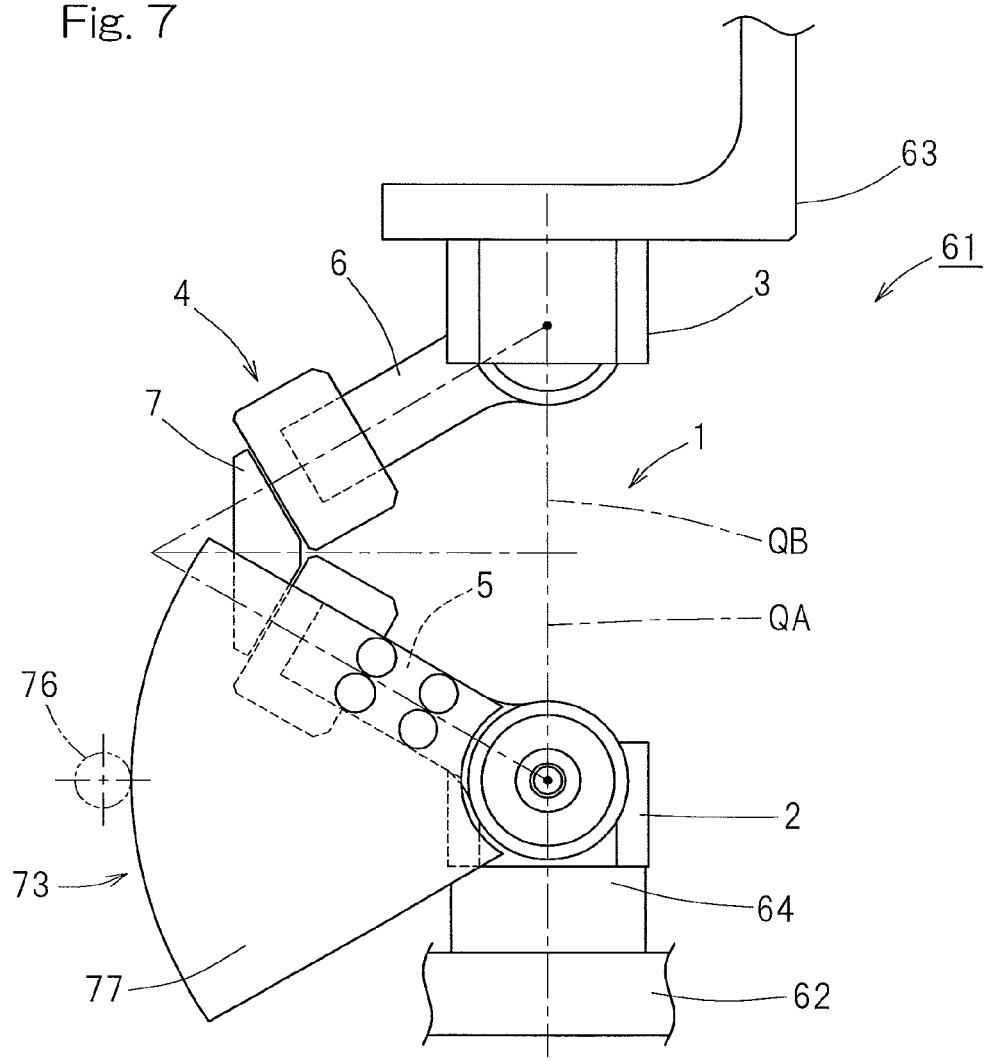
FIG. 7 is a front view showing a link actuator, with a portion thereof omitted, according to a second embodiment of the present invention.

FIG. 7 to FIG. 10 show a second embodiment for a different link actuator. As shown in FIG. 7, the link actuator 61 is of a type in which a distal end mounting member 63, on which a various type of instrument or the like is mounted, is connected to the distal end side of a proximal end side base 62 via the link mechanism body 1 such that alteration in posture is allowed. Between the base 62 and the proximal end side link hub 2 of the link mechanism body 1, a spacer 64 is interposed.

Figure 9:
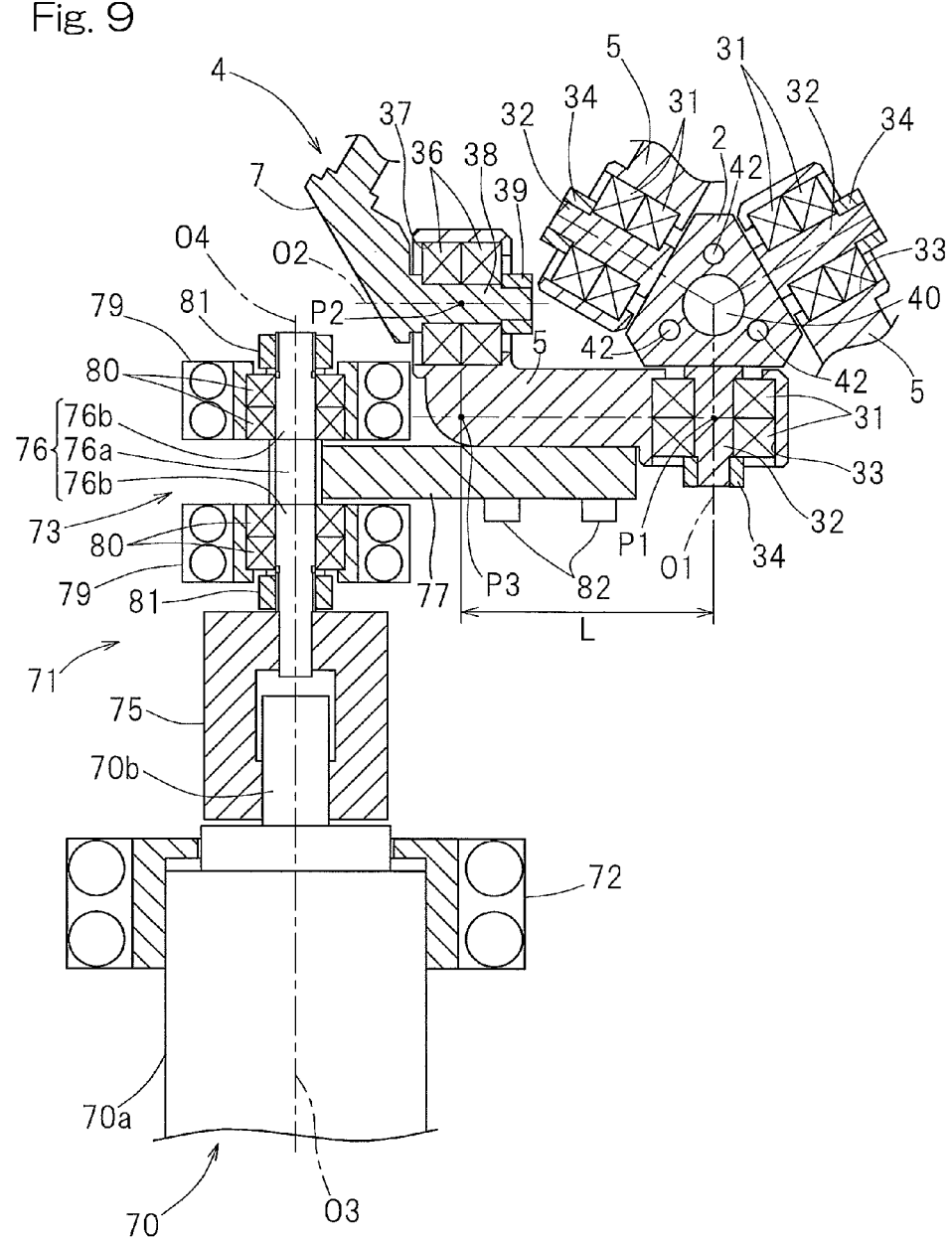
FIG. 9 is a partial enlarged view of FIG. 8.

As shown in FIG. 9, the link mechanism body 1 has bearings 31 of an outer ring rotation type, which rotatably support each proximal side end link member 5 relative to the proximal end side link hub 2 and each distal side end link member 6 relative to the distal end side link hub 3. The revolute pair section between the proximal end side link hub 2 and the proximal side end link member 5 is explained as an example. The proximal end side link hub 2 has shaft portions 32 formed at three positions in the circumferential direction thereof. Inner rings (not shown) of the two bearings 31 are fitted on the outer periphery of each shaft portion 32, and outer rings (not shown) of the bearings 31 are fitted on the inner periphery of a communication hole 33 formed in each proximal side end link member 5. Each bearing 31 is a ball bearing such as, for example, a deep groove ball bearing or an angular contact ball bearing, and is fixed under a predetermined preload amount applied by being fastened with a nut 34. The revolute pair section between the distal end side link hub 3 and the distal side end link member 6 has the same structure as that described above.

Bearings 36 are provided in the revolute pair section between the proximal side end link member 5 and the intermediate link member 7, and includes outer rings (not shown) fitted on the inner periphery of a communication hole 37 formed at the distal end of the proximal side end link member 5 and inner rings (not shown) fitted on the outer periphery of a shaft portion 38 provided integrally with the intermediate link member 7. Each bearing 36 is a ball bearing such as, for example, a deep groove ball bearing or an angular contact ball bearing, and is fixed under a predetermined preload amount applied by being fastened with a nut 39. The revolute pair section between the distal side end link member 6 and the intermediate link member 7 has the same structure as that described above.

Figure 10:
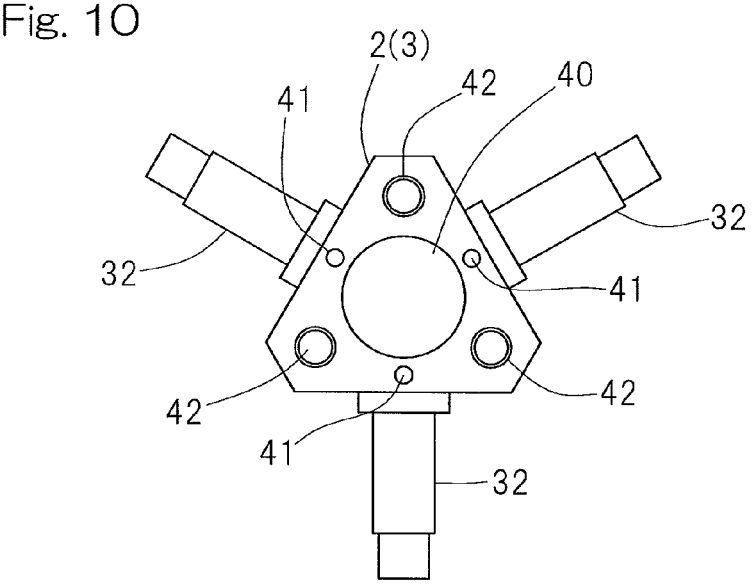
FIG. 10 is a bottom view of a proximal end side link hub of the link actuator.

As shown in FIG. 10, a first through-hole 40 along the axial direction is formed in a center portion of each of the proximal end side and distal end side link hubs 2 and 3, and around the first through-hole 40, a plurality of first positioning pin insertion holes 41 and a plurality of fixing bolt holes 42 are provided. The center of the first through-hole 40 is aligned with the central axis QA, QB of the proximal end side and distal end side link hubs 2 and 3, and the internal diameter of the first through-hole 40 has a dimension that allows the origin positioning shaft 90 described later to be inserted therethrough in clearance fit. In the example shown, the number of the first positioning pin insertion holes 41 and the number of the fixing bolt holes 42 are each three, and the first positioning pin insertion holes 41 and the fixing bolt holes 42 are arranged alternately with each other around the first through-hole 40. Since there is no other member around the central axes QA and QB of the proximal end side and distal end side link hubs 2 and 3 of the link actuator 61 (FIG. 7), a relatively wide space is easy to be secured, and thus, the first through-holes 40 are easy to be provided.

Figure 8:
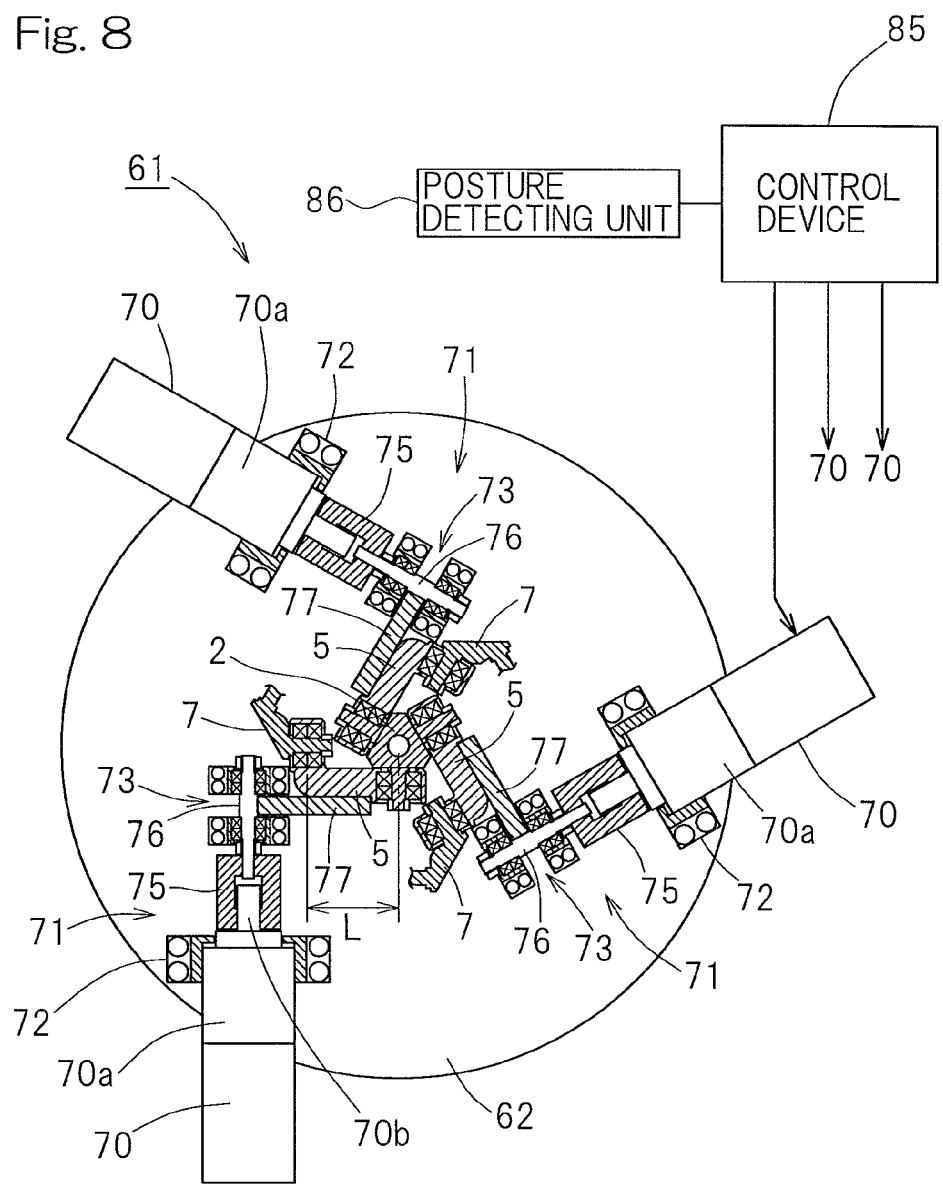
FIG. 8 is a horizontal sectional view of a portion of a link mechanism body of the link actuator.

As shown in FIG. 8 and FIG. 9, all of the three link mechanisms 4 of the link mechanism body 1 include an actuator 70 which arbitrarily alters the distal end posture by rotating its corresponding proximal side end link member 5, and a reduction gear unit 71 which transmits the amount of operation of the actuator 70 to the proximal side end link member 5 after reducing the speed thereof. The actuator 70 is a rotary actuator, more specifically, a servomotor equipped with a reduction gear 70a, and is fixed to the base 62 by means of a motor fixing member 72. The reduction gear unit 71 includes the reduction gear 70a of the actuator 70 and a gear type speed reducing section 73.

The gear type speed reducing section 73 includes a small gear 76 connected to an output shaft 70b of the actuator 70 via a coupling 75 in a rotation transmittable manner, and a large gear 77 fixed to the proximal side end link member 5 and meshed with the small gear 76. In the example shown, the small gear 76 and the large gear 77 are each a spur gear, and the large gear 77 is a sector gear having gear teeth formed only on a peripheral surface of the arc portion thereof. The large gear 77 has a radius of pitch circle greater than that of the small gear 76, and the rotation of the output shaft 70b of the actuator 70 is transmitted to the proximal side end link member 5 after the rotation has been reduced in speed and made into rotation about a rotation axis O1 of the revolute pair between the proximal end side link hub 2 and the proximal side end link member 5. The speed reduction ratio is set to be 10 or higher.

The radius of the pitch circle of the large gear 77 is set to be greater than or equal to ½ of an arm length L of the proximal side end link member 5. The arm length L is the distance from an axial center point P1 of the central axis O1 of the revolute pair between the proximal end side link hub 2 and the proximal side end link member 5 to a point P3, the point P3 being obtained by projecting an axial center point P2 of a central axis O2 of the revolute pair between the proximal side end link member 5 and the intermediate link member 7 onto a plane that is orthogonal to the axis O1 of the revolute pair between the proximal end side link hub 2 and the proximal side end link member 5 and that passes through the axial center point P1. In the case of the second embodiment, the radius of the pitch circle of the large gear 77 is greater than or equal to the arm length L, which is advantageous for obtaining a high speed reduction ratio.

The small gear 76 has a tooth portion 76a meshed with the large gear 77 and shank portions 76b protruding towards opposite sides of the tooth portion 76a. Each shank portion 76b is rotatably supported by two bearings 80 provided on a corresponding one of rotation support members 79 disposed on the base 62. Each bearing 80 is a ball bearing such as, for example, a deep groove ball bearing or an angular contact ball bearing. Other than the double row ball bearings as in the example shown, a roller bearing and/or a slide bearing may be employed. Outer rings (not shown) of the respective two bearings 80 have a shim (not shown) disposed therebetween, and by fastening a nut 81 threadedly engaged on the shank portion 76b, each bearing 80 is to receive a preload. The outer ring of the bearing 80 is press-fixed into the inner periphery surface of the rotation support member 79.

In the case of the second embodiment, the large gear 77 is a member separate from the proximal side end link member 5, and is removably mounted on the proximal side end link member 5 by means of connecting members 82 such as bolts or the like. The large gear 77 may be provided integrally with the proximal side end link member 5.

A rotation axis O3 of the actuator 70 and a rotation axis O4 of the small gear 76 lie on the same axis. These rotation axes O3 and O4 are set to be parallel to the axis O1 of the revolute pair between the proximal end side link hub 2 and the proximal side end link member 5, and at the same level in height from the base 62.

Also in the link actuator 61, as in the first embodiment, each actuator 70 is controlled by a control device 85 based on a detection signal from a posture detecting unit 86. The posture detecting unit 86 is implemented by an absolute type encoder, for example. The technique of the control performed by the control device 85 is the same as that described above, and thus, description thereof is omitted. Moreover, as in the case of the first embodiment, in order to eliminate deviation occurring in the distal end posture due to the backlash caused by the mechanisms such as the gear type speed reducing section 73 or the like, the position of an origin that serves as a reference for operation of each actuator 70 is initially set. The method for initially setting the position of the origin will be described later.

Since all of the three link mechanisms 4 in the link actuator 61 are each provided with the actuator 70 and the reduction gear unit 71, the link actuator 61 can be driven in good balance no matter what posture of the distal end side link hub 3 is taken relative to the proximal end side link hub 2. In other words, the balance of driving force is good. Accordingly, each of the actuators 70 can be made compact in size. Also, the provision of the actuator 70 and the reduction gear unit 71 in all of the three link mechanisms 4 makes it possible to perform control such that rattling of the link mechanism body 1 and/or the reduction gear unit 71 can be cut down. Thus, the positioning accuracy of the distal end side link hub 3 can be increased, and also, the link actuator 61 itself can have a high rigidity.

The gear type speed reducing section 73 of the reduction gear unit 71 includes a combination of the small gear 76 and the large gear 77, and is capable of providing the speed reduction ratio of 10 or higher. If the speed reduction ratio is high, the positioning resolution of the encoder is rendered to be high, and therefore, the positioning resolution of the distal end side link hub 3 increases. Also, the actuator 70 of a low output can be used. In the second embodiment, although the actuator 70 with the reduction gear 70a is used, the use of the high speed reduction ratio of the gear type speed reducing section 73 makes it possible to use the actuator 70 having no reduction gear, and, as a result, the actuator 70 can be reduced in size.

Since the radius of the pitch circle of the large gear 77 is set to be greater than or equal to ½ of the arm length L of the proximal side end link member 5, the bending moment of the proximal side end link member 5, which is caused by a distal end loading, is rendered to be small. For this reason, the rigidity of the link actuator 61 as a whole can be maintained at a value not higher than necessary, and also the weight of the proximal side end link member 5 can be reduced. For example, the material of the proximal side end link member 5 can be changed from stainless steel (SUS) to aluminum. Also, since the radius of the pitch circle of the large gear 77 is relatively large, the surface pressure of a tooth portion of the large gear 77 decreases and the rigidity of the link actuator 61 as a whole increases. Also, if the radius of the pitch circle of the large gear 77 is greater than or equal to ½ of the arm length, the large gear 77 comes to have a sufficiently large diameter than the outer diameter of each bearing 32 that is disposed at the revolute pair section between the proximal end side link hub 2 and the proximal side end link member 5. Accordingly, space is created between the tooth portion of the large gear 77 and the bearing 31, and thus, the large gear 77 is easy to be disposed.

Particularly in the case of this second embodiment, since the radius of the pitch circle of the large gear 77 is greater than or equal to the arm length L, the radius of the pitch circle of the large gear 77 is further increased, and operations and effects are further remarkably exhibited. In addition, it is possible to dispose the small gear 76 on the outer diameter side relative to the link mechanism 4. As a result, the space for installing the small gear 76 can be easily secured and the degree of freedom of designing increases. Also, the interference between the small gear 76 and any other member will hardly occur, and the range of movement of the link actuator 61 expands.

Since the small gear 76 and the large gear 77 are each a spur gear, the manufacture thereof is easy and the transmission efficiency of rotation is high. Since the small gear 76 is supported by the bearings 80 on axially opposite sides, the support rigidity of the small gear 76 is high. Accordingly, the angle retaining rigidity of the proximal side end link member 5 under the distal end loading increases, and as a result, increase of the rigidity and the positioning accuracy of the link actuator 61 is achieved. Also, since the rotation axis O3 of the actuator 70, the rotation axis O4 of the small gear 76 and the central axis O1 of the revolute pair between the proximal end side link hub 2 and the proximal side end link member 5 lie on the same plane, the overall balance is good and the assemblability is also good.

Since the large gear 77 is removable from the proximal side end link member 5, change in specification such as, for example, the speed reduction ratio of the gear type speed reducing section 73 and the range of operation of the distal end side link hub 3 relative to the proximal end side link hub 2 is rendered to be easy, and the mass productivity of the link actuator 61 increases, accordingly. In other words, the common link actuator 61 can be applied in various applications merely by changing the large gear 77. Moreover, the maintenance is good. For example, when any trouble occurs in the gear type speed reducing section 73, mere replacement of only the gear type speed reducing section 73 is enough.

Next, the method for initially setting the position of an origin will be described with reference to FIG. 1, FIG. 7, and FIG. 8. The initial setting of the position of an origin according to the method for initially setting the position of an origin is performed in the following first to third steps.

In the first step, the distal end posture of the link actuator 51 (FIG. 1), 61 (FIG. 7) is set to a specified posture. The specified posture is a neutral posture in the design, and for example, is the posture when the output of each actuator 53 (FIG. 1), 70 (FIG. 8) is zero, in other words, the posture when the central axis QA of the proximal end side link hub 2 and the central axis QB of the distal end side link hub 3 lie on the same line. A specific technique for implementing the first step will be described later.

In the second step, a preload, which is a force that causes the backlash occurring in each revolute pair section, mechanism section or the like to be shifted to one side direction, is applied to the link actuator 51, 61 having the distal end posture being the specified posture. By so doing, the backlash in the meshing portion of the bevel gear 56, 57, the gear type speed reducing section 73 or the like of the link actuator 51, 61 is cut down. A specific technique for implementing the second step will be described later.

In the third step, an amount of operation of each actuator 53, 70, in a state where the preload is applied to the link actuator 51, 61, is stored. The amount of operation of each actuator 53, 70 is detected by the posture detecting unit 59 (FIG. 1), 86 (FIG. 8) implemented by the absolute type encoder. Then, an output value of the detection is stored in a storage section (not shown) of the control device 58 (FIG. 1), 85 (FIG. 8). For example, the amount of operation obtained in the third step is stored as the amount of operation of the actuator 53, 70 corresponding to the angle of rotation βn of the proximal side end link member 5 obtained when θ=0 and φ=0 are substituted in the equation 1.

The stored amount of operation as described above is set as the position of the origin of each actuator 53, 70, and the control device 58, 85 controls the actuator 53, 70. Accordingly, the actuator 53, 70 can be controlled without the influence of the backlash occurring in the link actuator 51, 61. Thus, the posture alteration accuracy of the distal end side link hub 3 relative to the proximal end side link hub 2 is good. By storing the amount of operation obtained in the third step as the amount of operation of the actuator 53, 70 as described above, no matter what posture is taken, posture control can be performed in a state where a preload that causes the backlash occurring in each revolute pair section, mechanism section or the like of the link actuator 51, 61 to be shifted to one side direction is applied to the link actuator 51, 61. Moreover, by detecting the amount of operation of the actuator 53, 70 by the posture detecting unit 59, 86 implemented by the absolute type encoder, even when the power is off and then supplied again, the initial setting need not be performed again, and thus, return to origin can be easily made.

Figure 11:
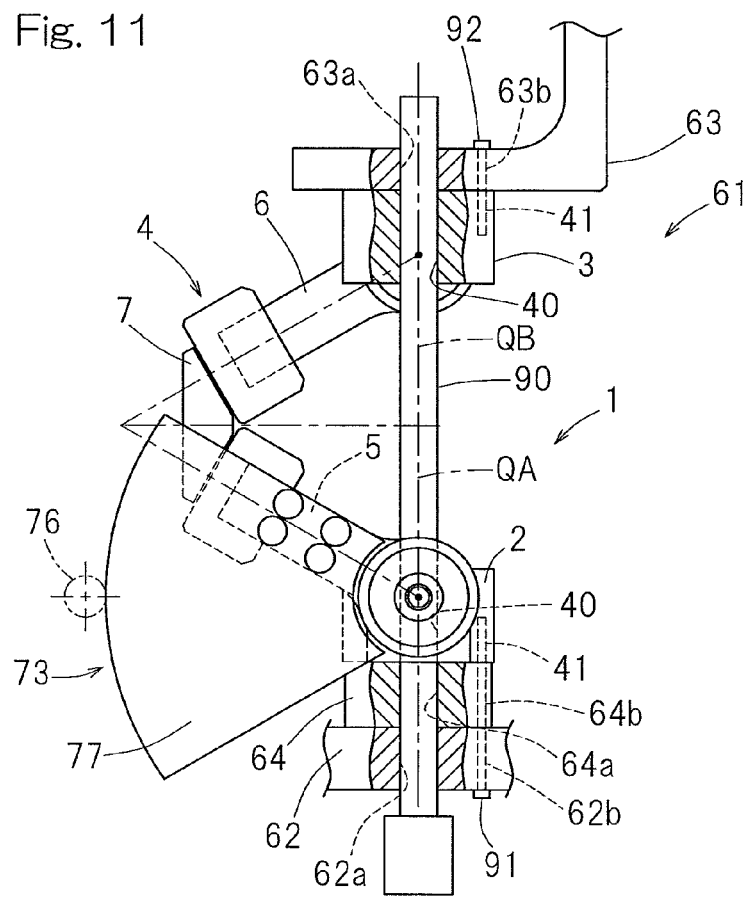
FIG. 11 illustrates one technique for implementing a first step of a method for initially setting a position of an origin in the link actuator of the present invention.

FIG. 11 shows a technique for implementing the first step. This technique is applied to the link actuator 61. By inserting the origin positioning shaft 90 through the first through-holes 40 of the proximal end side and distal end side link hubs 2 and 3, the distal end posture of the link actuator 61 is set to the specified posture. In this case, by a simple operation of inserting the origin positioning shaft 90 through the first through-holes 40 of the proximal end side and distal end side link hubs 2 and 3, the distal end posture of the link actuator 61 can be easily set to the specified posture. Since each first through-hole 40 is arranged such that its central axis is aligned with the central axis QA, QB of the proximal and distal end side link hubs 2 and 3, the preload can be applied to the link actuator 61 in good balance in the second step.

In this example, the base 62, the distal end mounting member 63 and the spacer 64 are respectively provided with second through-holes 62a, 63a and 64a, and the origin positioning shaft 90 is also inserted through these second through-holes 62a, 63a and 64a. Moreover, the base 62, the distal end mounting member 63 and the spacer 64 are respectively provided with second positioning pin insertion holes 62b, 63b and 64b corresponding to the first positioning pin insertion holes 41 of the proximal end side and distal end side link hubs 2 and 3. By inserting a positioning pin 91 into the first positioning pin insertion hole 41 and the second positioning pin insertion holes 62b and 64b, the proximal end side link hub 2, the base 62 and the spacer 64 are positioned with each other. Similarly, by inserting a positioning pin 92 into the first positioning pin insertion hole 41 and the second positioning pin insertion hole 63b, the distal end side link hub 3 and the distal end mounting member 63 are positioned with each other.

In a state where the base 62 and the spacer 64 are positioned with respect to the proximal end side link hub 2 by means of the origin positioning shaft 90 and the positioning pin 91, and the distal end mounting member 63 is positioned with respect to the distal end side link hub 3 by means of the origin positioning shaft 90 and the positioning pin 92 in the manner as described above, the base 62 and the spacer 64 are fixed to the proximal end side link hub 2 and the distal end mounting member 63 is fixed to the distal end side link hub 3, by means of fixing bolts (not shown) inserted through the fixing bolt holes 42. Therefore, even if the base 62, the distal end mounting member 63 and the spacer 64, all of them being mounting members, are removed from the proximal and distal end side link hubs 2 and 3 once, they can be fixed at the same positions when they are mounted next time. Therefore, there is no need to perform initial setting again when the mounting members are mounted next time. Moreover, by using the origin positioning shaft 90 also when performing positioning between the proximal and distal end side link hubs 2, 3 and the mounting member (the base 62, the distal end mounting member 63 and the spacer 64), positioning at only one position by use of the positioning pins 91, 92 makes it possible to complete positioning between the proximal and distal end side link hubs 2, 3 and the mounting member other than in the axial direction. Thus, if the proximal and distal end side link hubs 2, 3 and the mounting member is fixed together lastly with bolts or the like, positioning of the mounting member can be easily performed with fewer components.

Figure 12:
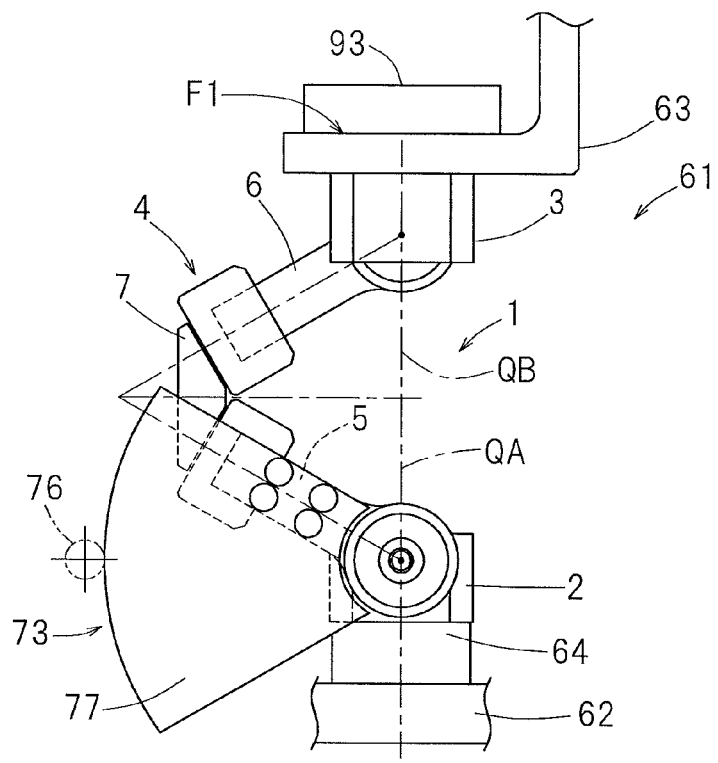
FIG. 12 illustrates a different technique for implementing the first step of the method for initially setting the position of the origin in the link actuator of the present invention.
Figure 13:
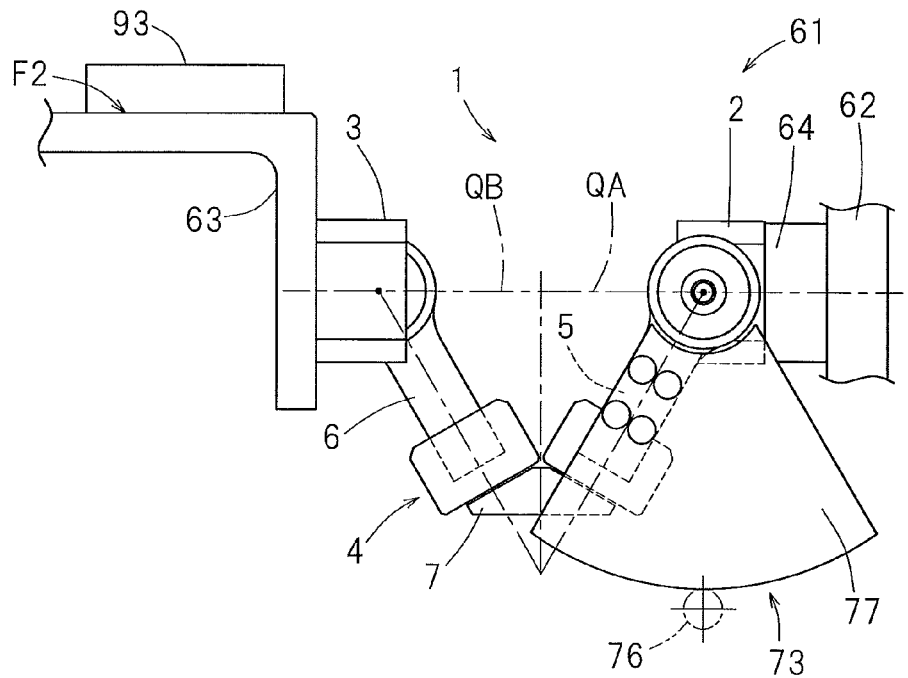
FIG. 13 illustrates a further different technique for implementing the first step of the method for initially setting the position of the origin in the link actuator of the present invention.

FIG. 12 and FIG. 13 each show a different technique for implementing the first step. The technique is applied to a case where the proximal end side link hub 2 of the link actuator 51 (FIG. 1), 61 (FIG. 7) is fixed in a posture in which the central axis QA thereof extends in the vertical direction, or in a case where the proximal end side link hub 2 is fixed in a posture in which the central axis QA thereof extends in the horizontal direction. FIG. 12 and FIG. 13 each show a case regarding the link actuator 61, but the same applies to the case of the link actuator 51.

FIG. 12 shows a case where the central axis QA of the proximal end side link hub 2 extends in the vertical direction. In this case, the distal end mounting member 63 is mounted on the distal end side link hub 3, and the levelness of a plane F1, in the distal end mounting member 63, that is orthogonal to the central axis QB of the distal end side link hub 3 is measured by a level gauge 93, and the distal end posture, when the plane F1 is horizontal, is defined as the specified posture.

FIG. 13 shows a case where the central axis QA of the proximal end side link hub 2 extends in the horizontal direction. In this case, the distal end mounting member 63 is mounted on the distal end side link hub 3, and the levelness of a plane F2, in the distal end mounting member 63, that is parallel to the central axis QB of the distal end side link hub 3 is measured by the level gauge 93, and the distal end posture, when the plane F2 is horizontal, is defined as the specified posture.

In many cases, the link actuator 51, 61 is disposed such that the central axis QA of the proximal end side link hub 2 extends in the vertical direction or the horizontal direction. Therefore, by using the level gauge 93 in this manner, the distal end posture can be easily set to the specified posture.

Figure 14:
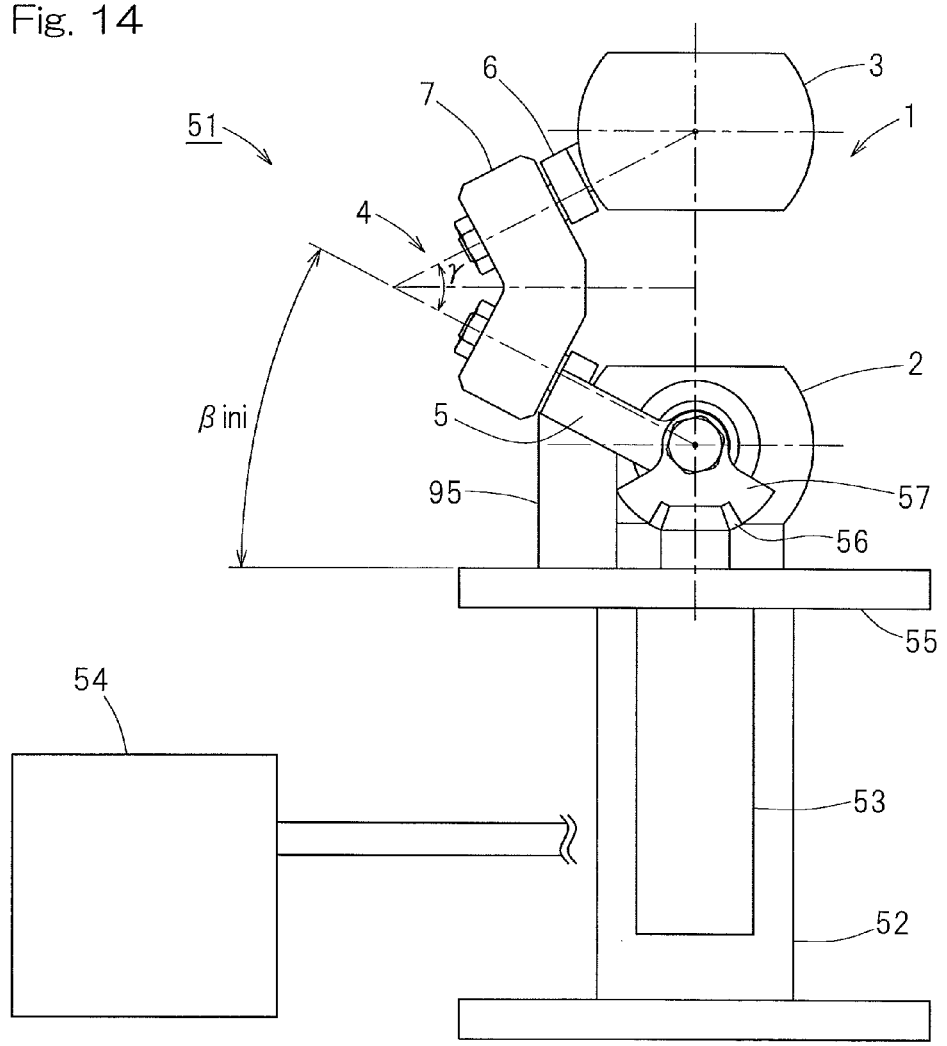
FIG. 14 illustrates a yet different technique for implementing the first step of the method for initially setting the position of the origin in the link actuator of the present invention.

FIG. 14 shows a further different technique for implementing the first step. This technique is applied to the link actuator 51. In this technique, in a case where the angle of the proximal side end link member 5 relative to the proximal end side link hub 2 when the distal end posture of the link actuator 51 is the specified posture is defined as βini, the posture of the link actuator 51 when the proximal side end link member 5 is fixed such that the angle of the proximal side end link member 5 relative to the proximal end side link hub 2 actually becomes βini is defined as the specified posture. In FIG. 14, by interposing an auxiliary fixing member 95 between the proximal side end link member 5 and the actuator mounting base 55, the proximal side end link member 5 is fixed so as to have the angle βini. The magnitude of the angle βini is γ/2, and thus, by substituting θ=0° in the equation 1 described above, the angle βini can be obtained. Also with this technique, the distal end posture can be easily set to the specified posture.

Figure 15:
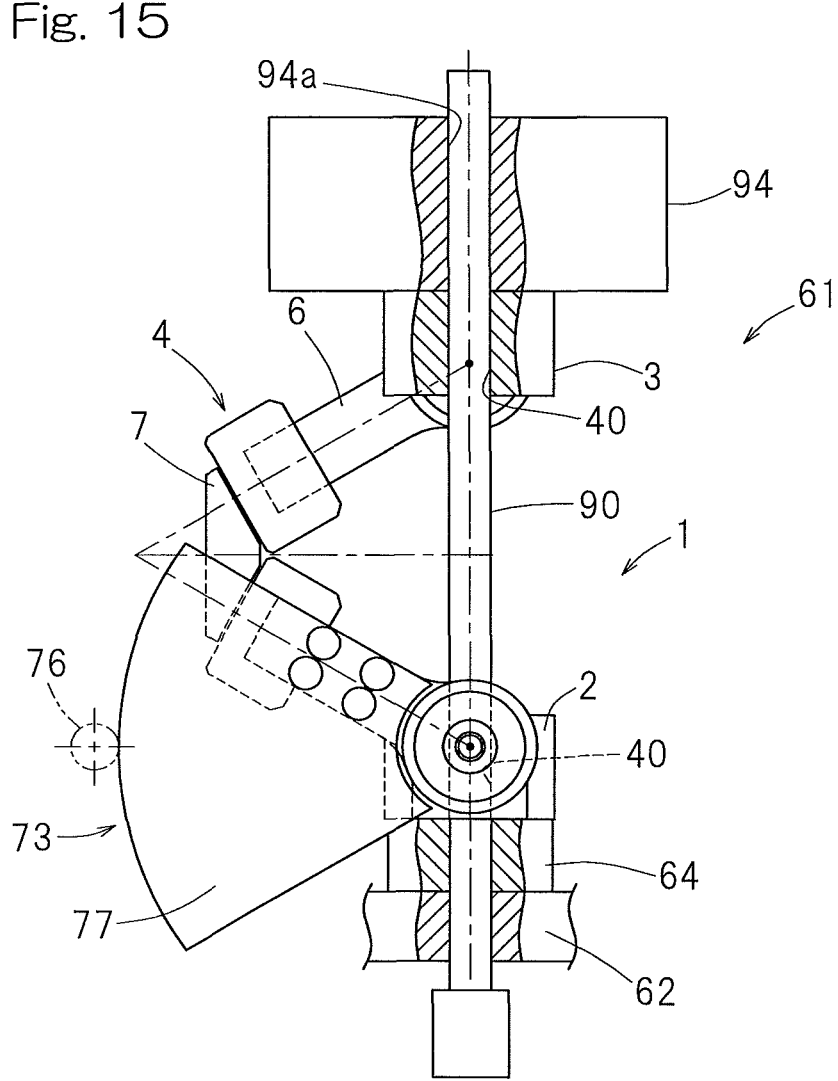
FIG. 15 illustrates a technique for implementing a second step of the method for initially setting the position of the origin in the link actuator of the present invention.

FIG. 15 shows a technique for implementing the second step. This technique is applied to the link actuator 61. In this technique, the proximal end side link hub 2 of the link actuator 61 is fixed, a weight member 94 is mounted on the distal end side link hub 3, and by means of the weight of the weight member 94, a preload is applied to the link actuator 61 taking the specified posture. In the example shown in FIG. 15, by inserting the origin positioning shaft 90 through the respective first through-holes 40 of the proximal end side and distal end side link hubs 2 and 3, the distal end posture of the link actuator 61 is set to the specified posture. The weight member 94 is also provided with a third through-hole 94a, and by inserting the origin positioning shaft 90 through the third through-hole 94a, the weight member 94 is positioned. Accordingly, the preload can be applied to the link actuator 61 in good balance. In the example shown in FIG. 15, the load caused by the weight member 94 is in the form of compressive load, but may be in the form of tensile load.

As described above, when the weight member 94 is used, an appropriate preload can be easily applied to the link actuator 61. Accordingly, the position of the origin can be stored in a state where the backlash caused by the mechanisms such as the gear type speed reducing section 73 or the like in the link actuator 61 is cut down, and thus, the positioning accuracy of the distal end side link hub 3 is increased.

In the second step, the preload may be applied to the link actuator 51, 61 by controlling the torque of each actuator 53, 70 mounted on the link actuator 51, 61. In this case, the preload can be easily applied, without providing another member for applying the preload. Moreover, by controlling the actuator 53, 70 by means of the control device 58, 85, a constant torque can be applied to each link mechanism 4, whereby balance in force is attained. Therefore, in a case where the link actuator 51, 61 is set to the specified posture by use of the origin positioning shaft 90, for example, even when the origin positioning shaft 90 is pulled out from the first through-holes 40 of the proximal and distal end side link hubs 2 and 3 (the through-holes 10 in the case of the link actuator 51), the position of the origin is not shifted to a great extent, whereby the position of the origin of the actuator 53, 70 can be accurately set.

As described above, although the preferred embodiments and application embodiments have been described with reference to the accompanying drawings, those skilled in the art will readily conceive numerous changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

2 . . . proximal end side link hub
3 . . . distal end side link hub
4 . . . link mechanism
5 . . . proximal side end link member
6 . . . distal side end link member
7 . . . intermediate link member
10, 40, 62a, 63a, 64a . . . through-hole
41, 62b, 63b, 64b . . . positioning pin insertion hole
42 . . . fixing bolt hole
51, 61 . . . link actuator
53, 70 . . . actuator
58, 85 . . . control device
59, 86 . . . posture detecting unit (absolute type encoder)
52, 62 . . . base (mounting member)
63 . . . distal end mounting member
64 . . . spacer (mounting member)
90 . . . origin positioning shaft
91, 92 . . . positioning pin
93 . . . level gauge
94 . . . weight member
QA . . . central axis of proximal end side link hub
QB . . . central axis of distal end side link hub

What is claimed is:

1. A method for initially setting a position of an origin that serves as a reference of operation of a link actuator, the link actuator including:
a proximal end side link hub;
a distal end side link hub; and
three or more link mechanisms which connect the distal end side link hub to the proximal end side link hub such that alteration in posture is allowed,
wherein each of the link mechanisms includes:
a proximal side end link member, one end of the proximal side end link member being rotatably connected to the proximal end side link hub;
a distal side end link member, one end of the distal side end link member being rotatably connected to the distal end side link hub; and
an intermediate link member whose two ends are rotatably connected to other ends of the proximal side end link member and the distal side end link member, respectively,
wherein each of the link mechanisms has such a shape that a geometric model of the link mechanism depicted in lines shows symmetry between a proximal end side portion thereof and a distal end side portion thereof with respect to an intermediate portion of the intermediate link member, and
wherein each of the three or more link mechanisms are provided with an actuator which arbitrarily alters a distal end posture which is a posture of the distal end side link hub relative to the proximal end side link hub for each of the three or more link mechanisms, respectively,
the method comprising:
a first step of setting the distal end posture of the link actuator to a specified posture;
a second step of applying a preload, which is a force that causes backlash occurring in each joint portion of the three or more link mechanisms to be shifted to one side direction, to the link actuator having the distal end posture being the specified posture; and
a third step of storing an amount of operation of each of the actuators in a state where the preload is applied to the link actuator,
wherein the stored amount of operation is set as a position of an origin of each of the actuators, and
wherein in the second step, each of the actuators applies the preload to the link actuator taking the specified posture.

2. The method for initially setting the position of the origin in the link actuator as claimed in claim 1, wherein in the first step, the distal end posture of the link actuator is set to the specified posture by inserting an origin positioning shaft through through-holes respectively provided in the proximal end side link hub and the distal end side link hub of the link actuator, and in this state, a mounting member is positioned to be mounted on both or either of the proximal end side link hub and the distal end side link hub of the link actuator.

3. The method for initially setting the position of the origin in the link actuator as claimed in claim 1, wherein in the first step, the proximal end side link hub of the link actuator is fixed to take a posture such that a central axis of the proximal end side link hub extends in a vertical direction, a mounting member is mounted on the distal end side link hub of the link actuator, levelness of a plane in this mounting member, that is orthogonal to a central axis of the distal end side link hub, is measured by a level gauge, and the distal end posture when the plane is horizontal is defined as the specified posture; or the proximal end side link hub of the link actuator is fixed to take a posture such that the central axis of the proximal end side link hub extends in a horizontal direction, a mounting member is mounted on the distal end side link hub of the link actuator, levelness of a plane in this mounting member, that is parallel to the central axis of the distal end side link hub, is measured by the level gauge, and the distal end posture when the plane is horizontal is defined as the specified posture.

4. The method for initially setting the position of the origin in the link actuator as claimed in claim 1, wherein in the first step, in a case where an angle of the proximal side end link member relative to the proximal end side link hub when the distal end posture of the link actuator is the specified posture is defined as βini, a posture of the link actuator when the proximal side end link member is fixed such that the angle of the proximal side end link member relative to the proximal end side link hub becomes βini is defined as the specified posture.

5. The method for initially setting the position of the origin in the link actuator as claimed in claim 1, wherein in the third step, an output value from an absolute type encoder detecting an amount of operation of each of the actuators is stored as the amount of operation of each of the actuators in a state where the preload is applied to the link actuator.

6. The method for initially setting the position of the origin in the link actuator as claimed in claim 1, wherein the amount of operation obtained in the third step is stored as an amount of operation of each actuator corresponding to an angle of rotation βn of the proximal side end link member obtained by substituting θ=0 and φ=0 in cos(θ/2)sin βn−sin(θ/2)sin(φ+δn)cos βn+sin(γ/2)=0, where an angle of rotation of the proximal side end link member relative to the proximal end side link hub is βn, an angle between a first connection end axis of the intermediate link member rotatably connected to the proximal side end link member and a second connection end axis of the intermediate link member rotatably connected to the distal side end link member is γ, an angle of spacing, in a circumferential direction, of each proximal side end link member relative to a proximal side end link member that serves as a reference is δn, a vertical angle formed when a central axis of the distal end side link hub is inclined relative to a central axis of the proximal end side link hub is θ, and a horizontal angle formed when the central axis of the distal end side link hub is inclined relative to the central axis of the proximal end side link hub is φ.

7. A method for initially setting a position of an origin that serves as a reference of operation of a link actuator, the link actuator including:

a proximal end side link hub;

a distal end side link hub; and three or more link mechanisms which connect the distal end side link hub to the proximal end side link hub such that alteration in posture is allowed, wherein each of the link mechanisms includes:

a proximal side end link member, one end of the proximal side end link member being rotatably connected to the proximal end side link hub;

a distal side end link member, one end of the distal side end link member being rotatably connected to the distal end side link hub; and an intermediate link member whose two ends are rotatably connected to other ends of the proximal side end link member and the distal side end link member, respectively, wherein each of the link mechanisms has such a shape that a geometric model of the link mechanism depicted in lines shows symmetry between a proximal end side portion thereof and a distal end side portion thereof with respect to an intermediate portion of the intermediate link member, and wherein each of the three or more link mechanisms are provided with an actuator which arbitrarily alters a distal end posture which is a posture of the distal end side link hub relative to the proximal end side link hub for each of the three or more link mechanisms, respectively, the method comprising:

a first step of setting the distal end posture of the link actuator to a specified posture;

a second step of applying a preload, which is a force that causes backlash occurring in each joint portion of the three or more link mechanisms to be shifted to one side direction, to the link actuator having the distal end posture being the specified posture; and a third step of storing an amount of operation of each of the actuators in a state where the preload is applied to the link actuator, wherein the stored amount of operation is set as a position of an origin of each of the actuators, and wherein in in the first step, the distal end posture of the link actuator is set to the specified posture by inserting an origin positioning shaft through through-holes respectively provided in the proximal end side link hub and the distal end side link hub of the link actuator.

8. The method for initially setting the position of the origin in the link actuator as claimed in claim 7, wherein in the second step, the proximal end side link hub of the link actuator is fixed, a weight member is mounted on the distal end side link hub, and the preload is applied to the link actuator taking the specified posture, by means of a weight of the weight member.

* * * * *

UNITED STATES PATENT AND TRADEMARK OFFICE
CERTIFICATE OF CORRECTION

PATENT NO. : 10,022,827 B2
APPLICATION NO. : 14/255214
DATED : July 17, 2018
INVENTOR(S) : Hiroshi Isobe et al.

It is certified that error appears in the above-identified patent and that said Letters Patent is hereby corrected as shown below:

In the Claims

Column 22, Line 30:
In Claim 7, delete "in in" and insert -- in --, therefore.

Signed and Sealed this
Thirtieth Day of October, 2018

Andrei Iancu
*Director of the United States Patent and Trademark Office*